United States Patent [19]

Ekman

[11] 3,990,730
[45] Nov. 9, 1976

[54] ARRANGEMENT IN CONNECTING FITTINGS FOR PRESSURE CONDUITS

[76] Inventor: B. Thure F. Ekman, Slalomvagen 12, 541 00 Skovde, Sweden

[22] Filed: Oct. 17, 1974

[21] Appl. No.: 515,608

[30] Foreign Application Priority Data
Oct. 23, 1973 Sweden .............................. 7314345

[52] U.S. Cl. ................................ 285/110; 285/345; 285/351; 285/379
[51] Int. Cl.² ..................................... F16L 17/00
[58] Field of Search ............ 285/110, 111, 345, 351, 285/379, 98, 281, 374, 349

[56] References Cited
UNITED STATES PATENTS

| | | | |
|---|---|---|---|
| 2,382,375 | 8/1945 | Allen et al. ............................ | 285/98 |
| 2,466,316 | 4/1949 | Jovanovich ...................... | 285/345 X |
| 3,089,713 | 5/1963 | Scaramucci ..................... | 285/111 X |
| 3,202,442 | 8/1965 | Abbey et al. ................... | 285/349 X |
| 3,264,006 | 8/1966 | Downs .......................... | 285/110 X |
| 3,532,364 | 10/1970 | Snyder, Jr. ..................... | 285/98 |
| 3,680,874 | 8/1972 | Schwarz ......................... | 285/111 X |
| 3,796,446 | 3/1974 | Shire et al. ...................... | 285/110 |

FOREIGN PATENTS OR APPLICATIONS

| | | | |
|---|---|---|---|
| 1,223,575 | 2/1960 | France .............................. | 285/351 |
| 724,948 | 2/1955 | United Kingdom .................. | 285/98 |

Primary Examiner—Dave W. Arola
Attorney, Agent, or Firm—Ulle C. Linton

[57] ABSTRACT

A connecting fitting for pressure conduits including a pair of coupling elements with corresponding bores and one element having a female portion capable of receiving a male portion of the other element and said female portion having spaced apart recesses with seals positioned therein cooperating with exterior surfaces of said male portion to provide seals therebetween. One of said seals spacing said male and female parts in the assembled position thereof and having a recess providing a pair of lips with an orifices therebetween opening into said space between said parts for receiving a medium under pressure in said conduits, for spreading said lip into sealing engagement with said male and female parts.

5 Claims, 1 Drawing Figure

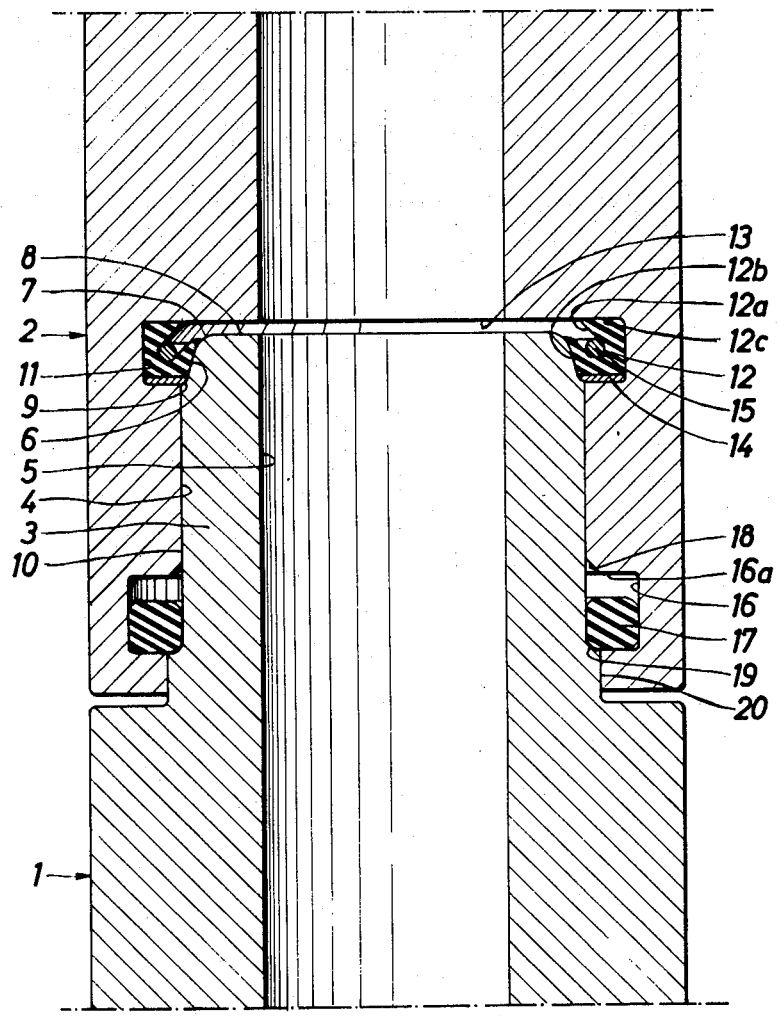

the axial extension of the notch surpasses

ARRANGEMENT IN CONNECTING FITTINGS FOR PRESSURE CONDUITS

The present invention relates to a connecting fitting for pressure conduits comprising two coupling elements, which can be connected with each other, one of which exhibiting a female part arranged to receive the male fitting part in a bore, the inner diameter of which substantially corresponds to the exterior diameter of the male part, the forepart of said male part as counted in the direction of insertion being provided with an oblique surface tightly fitting to an annular gasket, the invention specifically relating to the annular gasket functioning between the two coupling elements.

It is a principal object of the invention to provide a packing, which makes comparatively little resistance when introducing the male part into the female part, also in the particular case, when both the coupling elements contain a medium, preferably a liquid, which has to be displaced in connection with the fitting operation. It is another object of the invention to provide an efficient packing between the two coupling elements, which functions well even if the annular gasket contacting the forepart of the male part should exhibit certain defects as to its shape, which may be the result of some fault in connection with its manufacture or of damage caused in connection with its use.

Said objects are reached by means of a connection fitting designed in accordance with the invention, which principally is characterized by said annular gasket being designed in the shape of a lip ring placed in a notch of the wall of the male part, which lip ring is provided with an annular channel having an increasing diameter, counted towards its bottom and in the direction contrary to the direction of introduction of said male part, the walls of said lip ring shaping two lips, one of which in the connected condition of the two parts lying with a tight fit to the oblique surface of the male part, while the other lip tightly fits to a surface of the female part facing a direction contrary to the direction of introduction of the male part, so that a tight packing is created working in an axial direction on the female part and substantially in a radial direction on the male part, the effect of said packing being strengthened by the pressure of the medium flowing through said fitting elements being acting upon said lips via a constantly open access to said channel separating the two lips.

In the following description a preferred embodiment of the invention will be described with reference to the accompanying drawing, in which a coupling fitting provided with an arrangement according to the invention is illustrated in a roughly schematized longitudinal cross-sectional figure.

The only drawing shows, in cross section, the coupling fitting according to the present invention.

The coupling fitting illustrated in the drawing has two main parts, viz. a male part in its entirety indicated by 1, and a female art, in its entirety indicated by 2. The male part is introduced into the female part in the assembled condition illustrated in the drawing. The male part 1 (which in the followng is called the "male part"), has an exterior substantially cylindrically shaped male portion 3, and the female part (in the following called the "female part"), has a bore 4, the diameter of which substantially corresponds to the outside diameter of the male portion 3. Both the main parts have a centrally located through bore 5 for the pressure medium. In the assembled condition the two parts can be held together in any known manner, it therefore not being necessary to illustrate such an arrangement in the drawing and in the present description. At its front end the male part exhibits a substantially conical chamfer 6, which at the very front in a comparatively smooth bend passes to a crosswise extending end surface 8 and in a backwards direction exhibits a curved passage 9 to the substantially cylindrical mantle surface 10, said passage terminating in a forwards facing ledge. An annular notch 11 of substantially rectangular cross section is provided in the female part 2, in which notch a gasket 12 of lip ring type is placed which gasket is made with an annular groove 12a, having an increasing diameter counted towards its bottom and in a direction which is contrary to the direction of introduction, i.e. in a downwards direction in the drawing, the walls of said channel shaping two lips 12b, 12c, one of which is lying tight to the oblique surface 6 of the male portion in the fitted condition illustrated in the drawing, the other lips fits tight to a surface 13 of the female part facing in a direction, which is contrary to the direction of introduction of the male part, i.e. downwards in the drawing. By this arrangement a packing is created by the lip 12c working axially against the surface 13 of the female part, and a packing is created by the lip 12b working substantially in a radial direction on the male part 1. As the opening side of the groove 12a is located between the ledge 13 of the female part and the end surface 8 of the male portion in the assembled condition shown in the drawing, the groove is in constant communication with the pressure medium channel 5, which means, that the pressure medium reinforces the tight fit of the lips against their respective surfaces and in such a manner secures the efficient seal. As is evident from the drawing that side of the gasket 11 facing the male part is substantially given the same shape as the oblique surface of the male part. The free edge portions of the lips are slightly outwards curved in direction away from the center of the groove 12a, which means that the lips are lying tight against their respective sealing surfaces very close to their free edges. At the rear there is a flat supporting washer, which suitably can be made of metal, but it may also be made of other rigid material. The washer 14 can suitably be a separate springing washer, but it is of course within the scope of the invention to attach them to the gasket in a casting operation or by vulcanizing. The supporting washer extends radially past the surface 14 of the female part and terminates with a portion fitting to the passage 9 of the male part. According to the example of embodiment illustrated a springing tension ring 15 is placed in the groove 12a, the bias of which ring is directed towards the center of the coupling fittings, and which thus additionally reinforces the power, with which the lip 12b fits tight to the oblique surface of the male part. This makes possible that one can choose the material of the sealing gasket in the first place with a view to the wearing strength without having to pay too much consideration to the springing quality. As an example of a very lasting material, which however does not posess any springing quality worth mentioning, is tetrafluorethene, usually known in the market under the trade name Teflon. Still another annular notch 16 is provided in the female part at adistance further to the rear, in which notch a second uncompressed gasket 17 of substantially circular cross section is placed. As is evident from the drawing the axial extension of the notch surpasses the extension of the gasket 17 in the same direction. In its forward direction the wall 16a of the notch passes on to the cylindrical surface of the female part via a chamfer 18. Said shape of the gasket 17 has proved suitable, but it is of course within the scope of the invention to design the same of another cross section. Thus, by wayof example it can be designed in the shape of a lip ring, one lip of which fits tight to the bottom of the notch 16, the other lip fitting tight to the cylindrical portion 10 of the male part. At the rear the cylindrical portion 10 of the male part passes to a section 20 of a somewhat larger diameter via a concave surface 19 exhibiting a comparatively smooth curvature, the radius of which suitably corresponds to the radius of the cross section of the gasket 17. When the male part 1 is introduced into the female part 2, it brings with it the O-ring 17 so that it abuts against the front wall 16a of the notch 16. During this first phase of the introduction operation the gasket 17 will rest against the ledge shaped by the passage surface 9. During the continued movement of introduction of the male part the gasket 17 slides against the cylindrical surface 10 of said male part, the chamfer 18 thereby preventing the gasket from being caught by getting pinched between the two parts. Liquid located in front of the male part is brought to the position, in which the male part with its oblique surface has reached a light contact with the lip 12b of the gasket 12 past said gasket 12. This pressing movement of the pressure liquid past said gasket 12 goes on also at a light contact with the lip 12b. However, during the last phase of the coupling movement the counterpressure against the lip 12b is so great that additional liquid only with difficulty can pass the same. Said liquid enters instead the groove 16 in front of the gasket 17 thus pressing this gasket in a backwards direction. Therefore the notch 16 has to be of ample dimension, such as to be able to receive substantially all of the remaining liquid, which does not pass the lip 12b. By this arrangement one can perform the coupling operation without any leakage of the liquid in question and without having to subject the two coupling elements to any forces worth mentioning in order to bring them together. The fitting according to the invention has proved to be very well suited for use in connection with hydraulic liquid preferably is oil, but the arrangement is well suited for use in connection with other types of liquid.

The invention is not limited to the embodiment described and illustrated in the drawing by way of example only, but can be varied as to its details within the scope of the following claims without departing from the fundamental idea of the invention. Thus by way of example instead of the gasket 17 there may be a packing corresponding the oblique surfaces of the male part and the packing shaped by the gasket 12.

What I claim is:

1. Connecting fitting for pressure medium conduits comprising a pair of coupling elements which can be coupled together with low resistance when introduced to each other and having corresponding bores therethrough, one of said elements having a male portion with a cylindrical outer surface, the other of said elements having a female portion with a second bore defined by a wall whose inner diameter substantially corresponds to the outer diameter of said surface of said male portion, said female portion having a shoulder at the inner end of said second bore, said male portion having a free top end and an elongated oblique surface extending from said free top end to a shoulder in said outer surface of said male portion, said female portion having a first annular notch in said second bore wall positioned for facing said obliquesurface in the assembled position of said male and female portions, a first ring seal positioned in said first annular notch, said first ring seal being of a configuration and having a position for spacing apart said female portion shoulders from said male portion free top end in the connected position of said male and female portions, a second ring seal, said female portion having a second annular notch having said second ring seal displacably mounted therein and positioned for facing said male portion cylindrical outer surface in the connected position of said male and female portions, said second notch having a distinctively greater height than said second seal for permitting the displacement of said second seal therein during connection of said female and male portions and said second sealing ring being mounted in said second notch for being displaceable in an uncompressed condition toward the inner wall of said second notch by means of the male portion in an initial stage of said connection and for being displaceable by a medium cushion trapped between said first and second seals in an end stage of the connection and thereby allow said medium cushion to be absorbed in said second notch in front of said second seal.

2. Connecting fitting for pressure medium conduits comprising a pair of coupling elements which can be coupled together with low resistance when being introduced to each other and having corresponding bores therethrough, one of said elements having a male portion with a cylindrical outer surface, the other of said elements having a female portion with a second bore defined by a wall whose inner diamter substantially corresponds to the outer diameter of said surface of said male portion, said female portion having a shoulder at the inner end of said second bore, said male portion having a free top end and an elongated oblique surface extending from said free top end to a shoulder in said outer surface of said male portion, said female portion having an annular notch in said second bore wall positioned for facing said oblique surface in the assembled position of said male and female portions and which annular notch is defined by a front wall on said female portion shouler, a bottom wall and a rear wall, a ring seal being positioned in said annular notch and having a pair of elongated lips and an annular groove between said lips, one of said ring seal lips being positioned and has a configuration for tightly engaging the front and bottom walls of said annular notch, the other of said ring seal lips being positioned and having a configuration for being engageable only mainly with said male portion oblique surface in an end stage of the connecting procedure and for tightly engaging the major part of said male portions oblique surface in the connected position of said male and female portions and for inclining from its base over the male portion shoulder and the lap between the male and female portions, said ring seal being of a configuration for spacing apart said female portion shoulder from said male portion free top end in the connected position of said male and female portions and said ring seal annular groove having its mouth facing said female portion shoulder for receiving fluid from said coupling elements bores when in use whereby said fluid presses said first lip against all the notch walls and said second lip against said oblique surface and said shoulder of the male portion.

3. Connecting fitting as claimed in claim 2 including a ring shaped spring seated in said ring seal annular groove with the bias of said spring being directed radially towards said second lip.

4. Connecting fitting as claimed in claim 2 including a second ring seal, said female portion having a second annular notch having said second ring seal slideably mounted therein and positioned for facing said male portion cylindrical outer surface in the connected position of said male and female portions and said second notch having a greater height than said second seal for permitting the sliding of said second seal therein during connection of said female and male portions.

5. Connecting fitting as claimed in claim 4 wherein said female portion has a chamfer connecting said second annular notch with said female portion second bore wall.

* * * * *